United States Patent [19]
Campbell, Jr.

[11] Patent Number: 5,504,782
[45] Date of Patent: Apr. 2, 1996

[54] CURRENT MODE TRANSMITTER AND RECEIVER FOR REDUCED RFI

[75] Inventor: Jules D. Campbell, Jr., Austin, Tex.

[73] Assignee: Motorola Inc., Schaumburg, Ill.

[21] Appl. No.: 282,382

[22] Filed: Jul. 29, 1994

[51] Int. Cl.⁶ ................................... H04L 27/00
[52] U.S. Cl. ............ 375/259; 327/103; 330/257
[58] Field of Search ................. 375/259, 286, 375/288, 257; 327/103, 102; 330/257

[56] References Cited

U.S. PATENT DOCUMENTS

| | | | |
|---|---|---|---|
| 4,742,309 | 5/1988 | Chu | 375/257 |
| 4,896,333 | 1/1990 | Can | 375/257 |
| 5,148,120 | 9/1992 | Kano et al. | 330/264 |
| 5,192,879 | 3/1993 | Aoki et al. | 307/451 |
| 5,198,699 | 3/1993 | Hashimoto et al. | 307/270 |
| 5,216,291 | 6/1993 | Seevinck et al. | 307/296.6 |
| 5,337,042 | 8/1994 | Hormel et al. | 375/238 |
| 5,363,405 | 9/1994 | Hormel. | |

OTHER PUBLICATIONS

Toumazou et al., "Analogue IC design: the current–mode approach", 1990, pp. 93–111.
Quigley et al., "Current Mode Transceiver Logic, (CMTL) For Reduced Swing CMOS Chip to Chip Communication", Proceedings of 6th Annual IEEE Int. ASIC Conf., Oct. 93, pp. 452–455.

*Primary Examiner*—Stephen Chin
*Assistant Examiner*—Tesfaldet Bocure
*Attorney, Agent, or Firm*—Daniel D. Hill

[57] ABSTRACT

A current mode transmitter (21) receives an input signal and converts the input signal to a current having at least two values. The current is transmitted across a transmission line (27) to a current mode receiver (30). The current mode receiver (30) has a low impedance input node (102) coupled to the transmission line (27) for receiving the current. Complementary voltage-follower transistors (35, 36) in the receiver (30) are connected to the transmission line (27). A current mirror (31, 42) is coupled to each of the voltage-follower transistors (35, 36) to convert the current to a CMOS signal. The reduced signal swing of the transmitted signal reduces RFI emissions as compared to a signal having a larger signal swing.

18 Claims, 3 Drawing Sheets

5,504,782

CURRENT MODE TRANSMITTER AND RECEIVER FOR REDUCED RFI

FIELD OF THE INVENTION

This invention relates generally to noise reduction, and more particularly, to a current mode transmitter and receiver for reduced RFI.

BACKGROUND OF THE INVENTION

It is common for signals to be communicated between integrated circuits on a printed circuit board, or between integrated circuits on multiple printed circuit boards. Signals are transmitted via transmission lines, where the signals may be analog or digital, and the integrated circuits may include microprocessors, microcontrollers, memories, and the like. The transmission lines for carrying the signals may include a bus, a printed circuit board trace, wire, or other type of relatively long metal line.

The conventional transmission of high frequency analog and digital signals may create radio frequency interference (RFI). An intensity of the RFI is related to frequency, duty cycle, amplitude, and edge rates of the transmitted signal. RFI emissions may adversely affect other electronics, such as FM (frequency modulation) radio receivers, and contribute to "crosstalk" on nearby transmission lines.

Shielding, such as coaxial cable has been extensively used to reduce RFI emissions from transmission lines. However, coaxial cable and other shielding methods are typically expensive and may be somewhat unwieldy and difficult to implement effectively.

SUMMARY OF THE INVENTION

Accordingly, there is provided, in one form, a data processing system, including a transmitter on a first integrated circuit and a receiver on a second integrated circuit. The transmitter receives an input voltage signal, and in response, converts the input voltage signal to a current having at least two values at an output node of the transmitter. The receiver has an input node coupled to the output node of the transmitter. The receiver has a low input impedance for receiving the current, and in response, converts the current to a voltage to provide an output voltage signal. These and other features and advantages will be more clearly understood from the following detailed description taken in conjunction with the accompanying drawings.

DESCRIPTION OF A PREFERRED EMBODIMENT

Generally, the present invention provides a current mode transmitter for receiving a input voltage signal and converting the input voltage signal to a current that is transmitted along a transmission line, where the current has at least two values, each value representing a logic level. A current mode receiver has an input of an inverting gain amplifier coupled to the transmission line. The output of the inverting gain amplifier is coupled to the input of a non-inverting voltage follower. The output of the non-inverting voltage follower is coupled back to the transmission line and to the input of the inverting gain amplifier, thereby forming a low impedance node for receiving the current. Because the receiver has a relatively low input impedance, there is a reduced signal swing along the transmission line, requiring a relatively low transmitted current. A current mirror is coupled to each of the voltage-followers to convert the current to a CMOS (complementary metal-oxide semiconductor) voltage level signal. Transmission of a relatively low current with reduced signal swing reduces RFI emissions as compared to a signal having a larger signal swing. RFI emissions from the transmission line may adversely affect other nearby electronic circuits. The low input impedance of the receiver also reduces its susceptibility to capacitively coupled noise signals.

Figure 1:
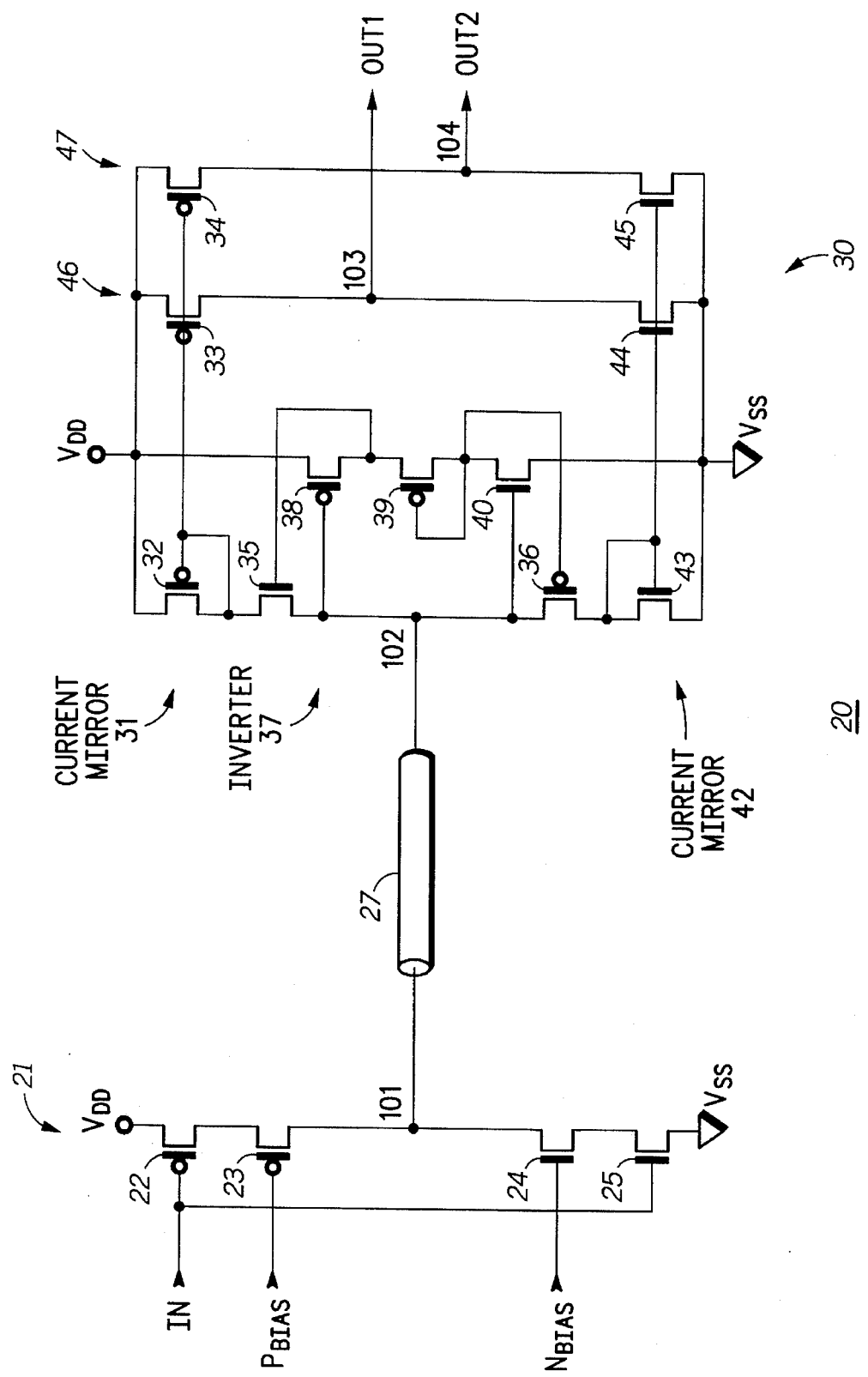
FIG. 1 illustrates in schematic diagram form, a CMOS current mode transmitter and receiver in accordance with one embodiment of the present invention.

The present invention can be more fully described with reference to FIGS. 1–4. FIG. 1 illustrates in schematic diagram form, CMOS current mode transmitter and receiver 20 in accordance with one embodiment of the present invention. Transmitter and receiver 20 includes transmitter 21 and receiver 30. Transmitter 21 includes P-channel transistors 22 and 23, and N-channel transistors 24 and 25. Receiver 30 includes P-channel transistors 32, 33, 34, 36, 38, and 39, and N-channel transistors 35, 40, 43, 44, and 45. P-channel transistor 33 and N-channel transistor 44 form a current repeater 46. P-channel transistor 34 and N-channel transistor 45 form current repeater 47. An inverter 37 is formed by the P-channel transistors 38 and 39, and N-channel transistor 40. An output node 101 of transmitter 21 is connected to an input node 102 of receiver 30 via transmission line 27. Transmission line 27 can be a wire, board trace or other conductor. A return path may be through the ground circuit ($V_{SS}$).

In transmitter 21, P-channel transistor 22 has a source connected to a power supply voltage terminal labeled "$V_{DD}$", a gate for receiving an input signal labeled "IN", and a drain. P-channel transistor 23 has a source connected to the drain of P-channel transistor 22, a gate for receiving a bias voltage labeled "$P_{BIAS}$", and a drain connected to output node 101. N-channel transistor 24 has a drain connected to the drain of P-channel transistor 23 at output node 101, a gate for receiving a bias voltage labeled "$N_{BIAS}$", and a source. N-channel transistor 25 has a drain connected to the source of N-channel transistor 24, a gate connected to the gate of P-channel transistor 22 for receiving input signal IN, and a source connected to a power supply voltage terminal labeled "$V_{SS}$".

In receiver 30, a current mirror 31 is formed by P-channel transistors 32, 33, and 34, and a current mirror 42 is formed by N-channel transistors 43, 44, and 45. P-channel transistor 32 has a source connected to power supply voltage terminal $V_{DD}$, and a gate and a drain connected together. P-channel transistor 33 has a source connected to $V_{DD}$, a gate connected to the gate and drain of P-channel transistor 32, and a drain connected to output node 103. P-channel transistor 34 has a source connected to $V_{DD}$, a gate connected to the gate and drain of P-channel transistor 32, and a drain connected to output node 104. N-channel transistor 35 has a drain connected to the drain of P-channel transistor 32, a gate, and a source connected to input node 102. P-channel transistor 36 has a source connected to the source of N-channel transistor 35, a gate, and a drain. N-channel transistor 43 has a drain and a gate both connected to the drain of P-channel transistor 36, and a source connected to power supply voltage terminal $V_{SS}$. N-channel transistor 44 has a drain connected to the drain of P-channel transistor 33 at output node 103, a gate connected to both the gate and drain of N-channel transistor 43, and a source connected to $V_{SS}$. N-channel transistor 45 has a drain connected to the drain of P-channel transistor 34 at output node 104, a gate connected to both the gate and drain of N-channel transistor 43, and a source connected to $V_{SS}$. P-channel transistor 38 has a source connected to $V_{DD}$, a gate connected to the source of N-channel transistor 35 at input node 102, and a drain connected to the gate of N-channel transistor 35. P-channel transistor 39 has a source connected to the drain of P-channel transistor 38, and a gate and a drain both connected to the gate of P-channel transistor 36. N-channel transistor 40 has a drain connected to both the gate and drain of P-channel transistor 39, a gate connected to the source of P-channel transistor 36 at input node 102, and a source connected to $V_{SS}$. N-channel transistor 35 and P-channel transistor 36 both function as voltage-followers.

Figure 2:
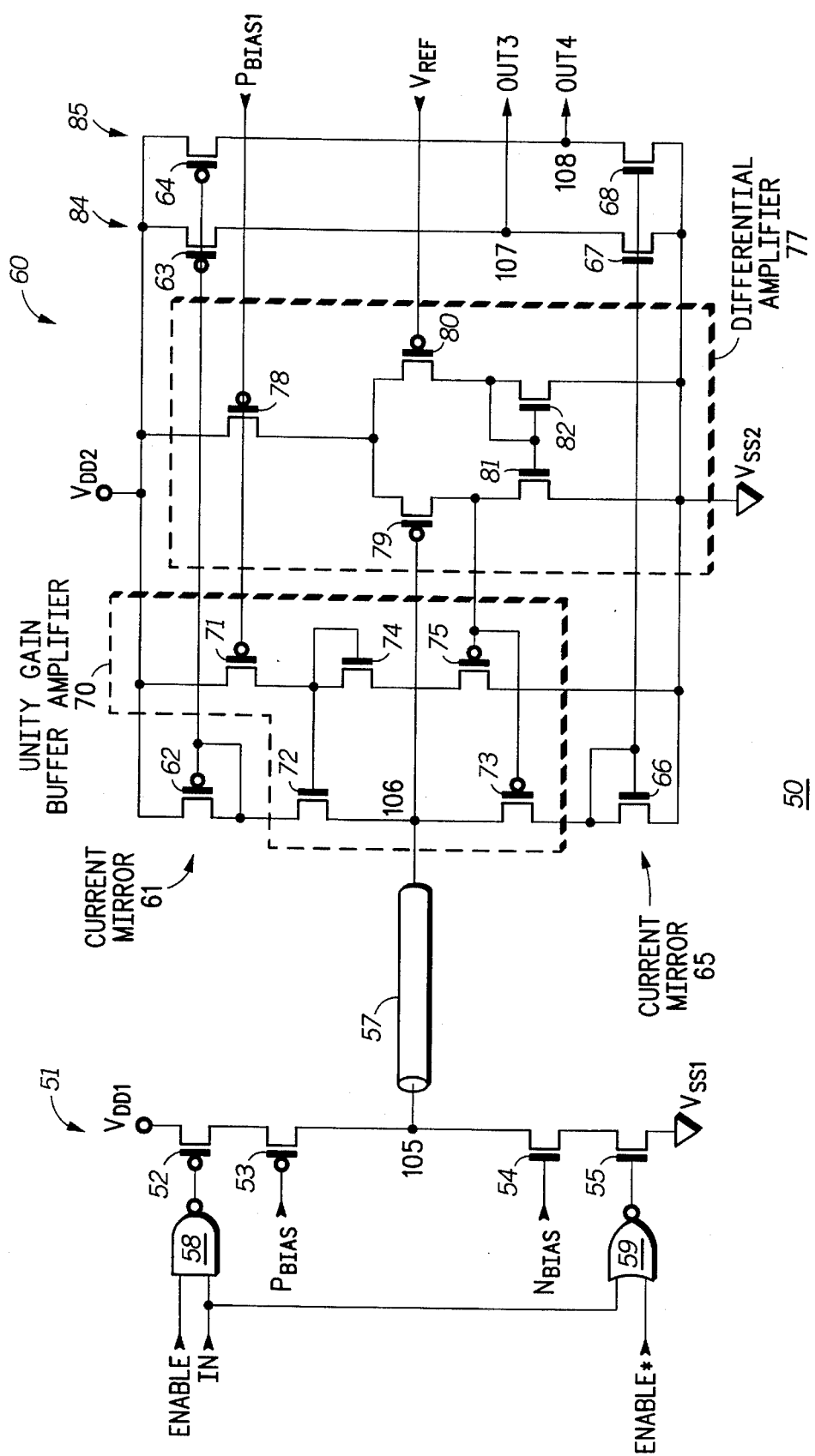
FIG. 2 illustrates in schematic diagram form, a CMOS current mode transmitter and receiver in accordance with another embodiment of the present invention.

In operation, transmitter 21 receives a digital input signal IN, and provides a current at output node 101 having two values. One current value represents a logic high, and the other current value represents a logic low. In the illustrated embodiments, the current is bi-directional. In other embodiments, the current may be uni-directional. In a preferred embodiment, input signal IN is a CMOS level digital logic signal. However, in other embodiments, input signal IN may be an analog signal. P-channel transistor 23 and N-channel transistor 24 are biased into saturation when made conductive by P-channel transistor 22 and N-channel transistor 25 being conductive, so that they provide relatively constant current sources and render transmitter 21 less sensitive to the power supply voltage variations. Transmitter 21 functions as an inverter. When input signal IN is a logic high voltage, N-channel transistor 25 is relatively more conductive and sinks current from output node 101, causing a logic low to be transmitted along transmission line 27. When input signal IN is a logic low, P-channel transistor 22 becomes relatively more conductive and sources more current to output node 101, causing a logic high to be transmitted along transmission line 27. A signal swing at output node 101 is determined by a load capacitance, operating frequency, and the impedance of node 102 and transmission line 27. However, the current transmitted across transmission line 27 is still relatively low, as determined primarily by bias voltages $P_{BIAS}$ and $N_{BIAS}$ and the sizes of P-channel transistor 23 and N-channel transistor 24. Additional control circuitry could be used to allow more than one transmitter 21 to be connected to a single receiver. An example of control circuitry suitable for this purpose is illustrated in FIG. 2, which will be discussed later.

In receiver 30, the current transmitted across transmission line 27 by transmitter 21 is received at low impedance node 102 of receiver 30. If the transmitted current represents a logic high, indicating that input signal IN is a logic low, N-channel transistor 40 is relatively more conductive, and P-channel transistor 38 is relatively less conductive. The voltage at the gate of P-channel transistor 36 is reduced, causing P-channel transistor to be more conductive than N-channel transistor 35. A larger current is sunk through N-channel transistor 43 than the current sourced through P-channel transistor 32. The current through N-channel transistor 43 is mirrored by N-channel transistors 44 and 45, producing logic low output signals OUT1 and OUT2 at output nodes 103 and 104, respectively. The voltage level of output signals OUT1 and OUT2 therefore correspond to the voltage level of input signal IN. Note that for illustration purposes, two output nodes (103 and 104) are illustrated in FIG. 1. However, in other embodiments there may be more or less than two output nodes.

When input signal IN is a logic high voltage, the transmitted current at node 101 is a logic low. P-channel transistor 38 is relatively more conductive than N-channel transistor 40, providing a higher voltage at the gate of N-channel transistor 35. N-channel transistor 35 is therefore more conductive than P-channel transistor 36, allowing P-channel transistor 32 of current mirror 31 to source more current than N-channel transistor 43 sinks. A current-to-voltage conversion occurs in current mirrors 31 and 42, so that a CMOS level output voltage signal is provided at output nodes 103 and 104. P-channel transistors 33 and 34 mirror the current sourced by P-channel transistor 32, causing a logic high voltage to be provided to output nodes 103 and 104 of current repeaters 46 and 47, respectively. P-channel transistor 39 is provided to minimize crossover distortion by keeping a minimum gate-source voltage ($V_{GS}$) on both of N-channel voltage-follower transistor 35 and P-channel voltage-follower transistor 36, and in addition, causes voltage-follower transistors 35 and 36 to provide class AB operation.

Figure 3:
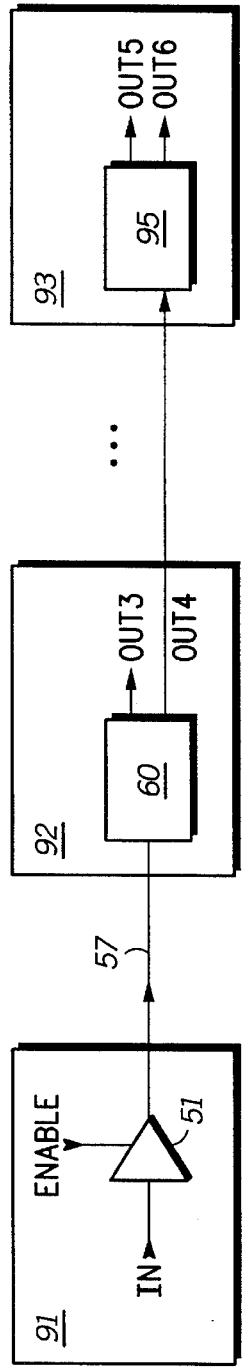
FIG. 3 illustrates in block diagram form, a data processing system including the CMOS current mode transmitter and receiver of FIG. 2.

The output terminals of current mirrors 31 and 42 are coupled together to form output nodes 103 and 104 of current repeaters 46 and 47, respectively. There may be as many current repeaters as necessary in a particular embodiment, as illustrated in FIG. 3. The current repeaters allow a single transmitter to communicate with a plurality of receivers on different modules or printed circuit boards. The use of the current repeaters will be discussed later with FIG. 3.

Transmitter and receiver 20 provides the advantage of reduced RFI emissions by converting an input signal to a relatively low current having at least two values. The receiver receives the relatively low current and converts the transmitted current to a voltage. By reducing the RFI emissions, the need for expensive shielding is reduced.

FIG. 2 illustrates in schematic diagram form, CMOS current mode transmitter and receiver 50 in accordance with another embodiment of the present invention. Transmitter and receiver 50 includes transmitter 51 and receiver 60. Transmitter 51 includes P-channel transistors 52 and 53, N-channel transistors 54 and 55, NAND logic gate 58, and NOR logic gate 59. Receiver 60 includes current mirrors 61 and 65, unity gain buffer amplifier 70, and differential amplifier 77. Current mirror 61 includes P-channel transistors 62, 63, and 64. Current mirror 65 includes N-channel transistors 66, 67, and 68. Unity gain buffer amplifier 70 includes P-channel transistors 71, 73, and 75, and N-channel transistors 72 and 74. Differential amplifier 77 includes P-channel transistors 78, 79, and 80, and N-channel transistors 81 and 82.

In transmitter 51, NAND logic gate 58 has a first input terminal for receiving an enable signal labeled "ENABLE", a second input terminal for receiving input signal IN, and an output terminal. P-channel transistor 52 has a source connected to a power supply voltage terminal labeled "$V_{DD1}$", a gate coupled to the output terminal of NAND logic gate 58, and a drain. P-channel transistor 53 has a source connected to the drain of P-channel transistor 52, a gate for receiving bias voltage $P_{BIAS}$, and a drain connected to output node 105. N-channel transistor 54 has a drain connected to the drain of P-channel transistor 53 at output node 105, a gate for receiving bias voltage $N_{BIAS}$, and a source. NOR logic gate 59 has a first input terminal for receiving input signal IN, a second input terminal for receiving an enable signal labeled "ENABLE*", and an output terminal. Note that enable signal ENABLE* is a logical complement of enable signal ENABLE. N-channel transistor 55 has a drain connected to the source of N-channel transistor 54, a gate connected to the output terminal of NOR logic gate 59, and a source connected to a power supply voltage terminal labeled "$V_{SS1}$".

In receiver 60, P-channel transistor 62 has a source connected to a power supply voltage terminal labeled "$V_{DD2}$", and a gate and a drain connected together. P-channel transistor 63 has a source connected to $V_{DD2}$, a gate connected to the gate of P-channel transistor 62, and a drain connected to output node 107. P-channel transistor 64 has a source connected to $V_{DD2}$, a gate connected to the gate of P-channel transistor 62, and a drain connected to output node 108.

P-channel transistor 71 has a source connected to $V_{DD2}$, a gate for receiving a bias voltage labeled "$P_{BIAS1}$", and a drain. N-channel transistor 72 has a drain connected to the drain of P-channel transistor 62, a gate connected to the drain of P-channel transistor 71, and a source connected to input node 106. P-channel transistor 73 has a source connected to the source of N-channel transistor 72, a gate, and a drain. N-channel transistor 74 has a drain and a gate both connected to the drain of P-channel transistor 71, and a source. P-channel transistor 75 has a source connected to the source of N-channel transistor 74, a gate connected to the gate of P-channel transistor 73, and a drain connected to a power supply voltage terminal labeled "$V_{SS2}$".

N-channel transistor 66 has a drain and a gate both connected to the drain of P-channel transistor 73, and a source connected to $V_{SS2}$. N-channel transistor 67 has a drain connected to the drain of P-channel transistor 63, a gate connected to the gate of N-channel transistor 66, and a source connected to $V_{SS2}$. N-channel transistor 68 has a drain connected to the drain of P-channel transistor 64 at output node 108, a gate connected to the gate of N-channel transistor 66, and a source connected to $V_{SS2}$.

P-channel transistor 78 has a source connected to $V_{DD2}$, a gate for receiving bias voltage $P_{BIAS1}$, and a drain. P-channel transistor 79 has a source connected to the drain of P-channel transistor 78, a gate connected to the source of N-channel transistor 72 at node 106, and a drain. P-channel transistor 80 has a source connected to the drain of P-channel transistor 78, a gate for receiving a reference voltage labeled $V_{REF}$, and a drain. The gate of P-channel transistor 79 is an inverting input, and the gate of P-channel transistor 80 is a non-inverting input. N-channel transistor 81 has a drain connected to the drain of P-channel transistor 79, a gate, and a source connected to $V_{SS2}$. N-channel transistor 82 has a drain connected to the drain of P-channel transistor 80, a gate and the drain connected to the gate of N-channel transistor 81, and a source connected to $V_{SS2}$.

In operation, transmitter 51 functions as a non-inverting circuit in a manner similar to transmitter 21 of FIG. 1. Node 105 has the same signal polarity as input signal IN. However, NAND logic gate 58 and NOR logic gate 59 gives transmitter 51 a high impedance operating mode, or a three-state operating capability, allowing more than one transmitter 51 to be coupled to a single receiver 60. Note that transmitter 21 may also use NAND logic gate 58 and NOR logic gate 59 to give transmitter 21 a high impedance operating mode.

In receiver 60, an input terminal of differential amplifier 77 is coupled to low impedance input node 106, and the other input terminal of differential amplifier 77 receives reference voltage $V_{REF}$, which may be derived from a bandgap voltage, a resistive divider circuit, or provided externally. Differential amplifier 77 performs an inverting amplification function to the voltage on node 106. N-channel transistor 72 and P-channel transistor 73 function as non-inverting voltage-followers. The open loop gain of differential amplifier 77 determines the range of conductivity of N-channel transistor 72 and P-channel transistor 73. Reference voltage $V_{REF}$ establishes a quiescent, or DC, voltage at low impedance input node 106. In a preferred embodiment, the quiescent voltage at node 106 was chosen to be about 1.5 volts to allow operation with a power supply voltage of about 3 volts. P-channel transistor 71 receives bias voltage $P_{BIAS1}$, and provides a current source for N-channel transistor 74 and P-channel transistor 75. N-channel transistor 74 provides threshold compensation for N-channel transistor 72 and P-channel transistor 75 provides threshold compensation for P-channel transistor 73. An impedance of input node 106 is determined by $1/(g_m A)$, where $g_m$ is the transconductance of N-channel transistor 72 and P-channel transistor 73, and A is the gain of differential amplifier 77. Increasing the gain of differential amplifier 77 reduces the impedance of input node 106, and therefore reduces the signal swing at node 106. In a preferred embodiment, a fundamental frequency component of the signal swing at node 106 is between 10 and 50 millivolts. This corresponds to about a 40 to 54 decibel (dB) reduction in RFI compared to a signal swing of about 5 volts. Unity gain buffer amplifier 70 functions as a unity gain class AB amplifier. The high output impedance of the current mirrors 61 and 65 converts the signal back to full swing voltage levels.

By way of example, a logic low current at input node 106 causes a decreased gate-to-source voltage of P-channel transistors 73 and 75, resulting in P-channel transistor 73 being relatively less conductive and N-channel transistor 72 being relatively more conductive. The reduced current through P-channel transistor 73 reduces a current through current mirror 65. The increased current through N-channel transistor 72 causes a corresponding increase in current sourced through current mirror 61. The increased current in current mirror 61 causes a logic high voltage to be provided to output nodes 107 and 108.

Likewise, a logic high current at input node 106 causes an increased gate-to-source voltage of P-channel transistor 73. P-channel transistor 73 sinks relatively more current, causing relatively more current through current mirror 65. The increased current through P-channel transistor 73 reduces the gate-to-source voltage of N-channel transistor 72, which reduces the conductivity of N-channel transistor 72, thus reducing the current through current mirror 61. The voltage at output nodes 107 and 108 are both reduced to a logic low voltage.

Transmitter and receiver 50 provides the advantage of reducing the voltage swing of a signal transmitted across a transmission line, thus reducing RFI emissions. Reduced RFI emissions reduces the need for expensive shielding. Also, receiver 60 can operate with a different power supply voltage than transmitter 51. In addition, the transmitter and receiver can operate with a ground difference, since the receiver determines the voltage at the receiving end of the transmission line.

FIG. 3 illustrates in block diagram form, data processing system 90 including CMOS current mode transmitter 51 and CMOS current mode receiver 60 of FIG. 2. Data processing system 90 includes module 91, module 92, and module 93. Modules 91, 92, and 93 represent a plurality of modules in a data processing system, and illustrate a scheme for allowing transmitter 51 to communicate with a plurality of receivers such as receiver 60. Note that the data processing system may process analog as well as digital signals. Module 91 includes transmitter 51 (from FIG. 2), module 92 includes receiver 60 (from FIG. 2), and module 93 includes receiver 95. Modules 91, 92, and 93 may on individual printed circuit boards, or separate integrated circuits (chips) on a single printed circuit board. Receiver 95 may be the same as receiver 60 or receiver 30 (FIG. 1).

In FIG. 3, transmitter 51 receives input signal IN. Input signal IN may be generated in module 91 or external to module 91. Similarly, enable signal ENABLE may be generated in module 91 or external to module 91. The enable signal allows a plurality of transmitters (not shown) to be coupled to a single receiver. The output of transmitter 51 is coupled to receiver 60 in module 92 via a transmission line, such as transmission line 57. In receiver 60, output signal OUT3 is used internally in module 92 (by other circuits not shown), while output signal OUT4 is provided to receiver 95 in module 93. Receiver 95 provides output signals labeled "OUT5" and "OUT6". Output signals OUT5 and OUT6 may be used internally by module 93, or transmitted to additional receivers (not shown). Note that transmitter 21 could be substituted for transmitter 51 and receiver 30 could be substituted for receiver 60 in FIG. 3 and FIG. 4.

A consideration when coupling together multiple receivers as illustrated in FIG. 3 is that there is a delay associated with each additional series connected receiver.

Figure 4:
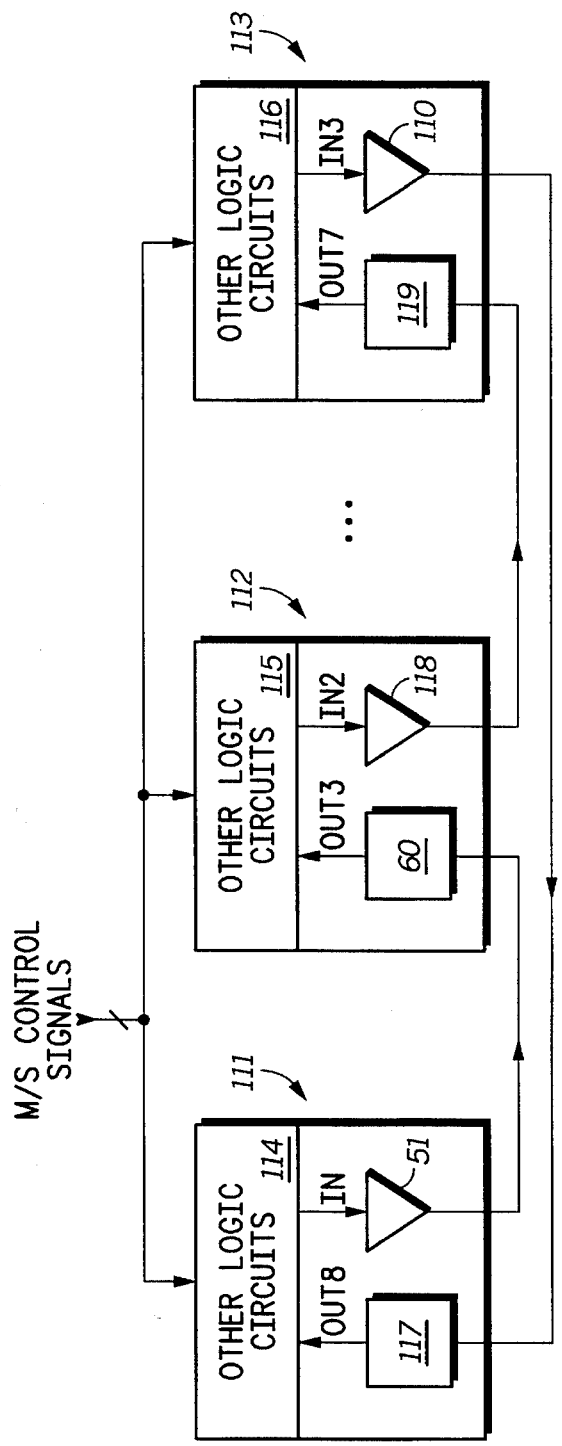
FIG. 4 illustrates in block diagram form, a data processing system including the CMOS current mode transmitter and receiver of FIG. 2.

FIG. 4 illustrates in block diagram form, data processing system 100 which includes CMOS current mode transmitter 51 and receiver 60 of FIG. 2. FIG. 4 illustrates another scheme for allowing communication between, for example, modules or printed circuit boards. The transmitters and receivers in the modules in data processing system 100 are connected in a master/slave ring. There is a transmitter/receiver pair on each of modules 111, 112, and 113. Module 111 includes transmitter 51 (FIG. 2), receiver 117, and other logic circuits 114. Module 112 includes transmitter 118, receiver 60 (FIG. 2), and other logic circuits 115. Module 113 includes transmitter 110, receiver 119, and other logic circuits 116. Each of modules 111,112, and 113 receives master/slave control signals labeled "M/S CONTROL SIGNALS". Other logic circuits 114, 115, and 116 each include logic circuits for performing a data processing function, such as for example, a microprocessor, a microcontroller, and/or a memory.

Transmitter 51 receives digital input signal IN from other logic circuits 114. An output terminal of transmitter 51 is coupled to an input terminal of receiver 60 via, for example, a board trace, wire, or other type of conductor. An output terminal of receiver 60 in module 112 is coupled to other logic circuits 115. Transmitter 118 has an input terminal coupled to other logic circuits 115 for receiving input signal IN2, and an output terminal coupled to an input terminal of receiver 119 in module 113. An output terminal of receiver 119 is coupled to other logic circuits 116. Transmitter 110 has an input terminal coupled to other logic circuits 116 for receiving input signal IN3, and an output terminal coupled to an input terminal of receiver 107, to complete the ring.

In operation, master/slave control signals M/S CONTROL SIGNALS are provided to select which module is to function as the "master" and therefore, which modules will be the "slaves". The master module can initiate the transmission of data to the other modules, or check the integrity of transmitted data. The slave modules relay data to the other modules in the ring, but can also use the data for internal processing in their respective module. As an example, if module 111 is the master module, transmitter 51 receives input signal IN from other logic circuits 114 to be transmitted to module 112. Receiver 60 receives data corresponding to input signal IN, and transmits the data to module 113 via transmitter 118. Other logic circuits 115 may also use the data internally. Receiver 119 receives the data corresponding to input signal IN, and like module 112, transmits the data to receiver 117 of module 114, but may also use the data internally.

The embodiments of FIG. 3 and 4 are useful for board-to-board or chip-to-chip communications with the advantage of reduced RFI emissions. By reducing RFI emissions, the need for expensive shielding, such as with coaxial cable, is reduced.

While the invention has been described in the context of a preferred embodiment, it will be apparent to those skilled in the art that the present invention may be modified in numerous ways and may assume many embodiments other than that specifically set out and described above. For example, transceivers 20 and 50 may also be implemented using bipolar or BICMOS (BICMOS includes bipolar transistors and CMOS transistors on the same integrated circuit) technology. Also, the number of current repeater circuits can be increased or decreased. In addition, in receiver 30, P-channel transistor 39 can be removed, or changed to any device that gives a voltage drop, such as a resistor. Furthermore, the voltage-follower transistors do not have to be coupled directly to the current mirrors. For example, the voltage-follower transistors can drive into a comparator which is coupled to the current mirrors. Accordingly, it is intended by the appended claims to cover all modifications of the invention which fall within the true spirit and scope of the invention.

What is claimed is:

1. A data processing system, comprising:

a transmitter having a first transistor for receiving an input voltage signal, and a second transistor coupled between the first transistor and an output node, the second transistor for receiving a first bias voltage, a third transistor for receiving the input voltage signal, and a fourth transistor coupled between the third transistor and the output node, the fourth transistor for receiving a second bias voltage, and in response to receiving the input voltage signal and the first and second bias voltages, the transmitter converting the input voltage signal to a first current having at least two values at the output node of the transmitter; and a receiver having an input node coupled to the output node of the transmitter, the receiver having a low input impedance for receiving the first current, and in response, converting the first current to a voltage to provide an output voltage signal.

2. The data processing system of claim 1, wherein the receiver comprises:

an inverter having an input terminal coupled to the output node of the transmitter, a first output terminal and a second output terminal;

a first voltage-follower transistor having a first current electrode, a control electrode coupled to the first output terminal of the inverter, and a second current electrode coupled to the input node of the receiver;

a second voltage-follower transistor having a first current electrode coupled to the input node of the receiver, a control electrode coupled to the second output terminal of the inverter, and a second current electrode;

a first current mirror having an input terminal coupled to the first current electrode of the first voltage-follower transistor, and an output terminal; and a second current mirror having an input terminal coupled to the second current electrode of the second voltage-follower transistor, and an output terminal coupled to the output terminal of the first current mirror for providing the output signal.

3. The data processing system of claim 2, wherein the first current mirror has a second output terminal coupled to a second output terminal of the second current mirror for providing a second output voltage signal.

4. The data processing system of claim 2, wherein the inverter comprises:

a first P-channel transistor having a source coupled to a first power supply voltage terminal, a gate coupled to the input node of the receiver, and a drain;

a resistive element having a first terminal coupled to the drain of the first P-channel transistor, and a second terminal; and an N-channel transistor having a drain coupled to the second terminal of the resistive element, a gate coupled to the input node of the receiver, and a source coupled to a second power supply voltage terminal.

5. The data processing system of claim 1, wherein the receiver comprises:

a first amplifier having a first input terminal for receiving a reference voltage, a second input terminal coupled to the input node of the receiver, and an output terminal;

a second amplifier having an input terminal coupled to the output terminal of the first amplifier, a first output terminal for providing a second current in response to the first current having a first value, and a second output terminal for providing a third current in response to the first current having a second value;

a first current mirror having an input terminal coupled to the first output terminal of the second amplifier for receiving the second current, and an output terminal; and a second current mirror having an input terminal coupled to the second output terminal of the second amplifier for receiving the third current, and an output terminal coupled to the output terminal of the first current mirror, for providing the output voltage signal.

6. The data processing system of claim 1, wherein the transmitter further comprises logic means for providing the transmitter with a high impedance operating mode.

7. The data processing system of claim 1, further comprising a plurality of transmitters and a plurality of receivers, the plurality of transmitters and the plurality of receivers coupled together to form a master/slave communication ring for the data processing system, a transmitter of the plurality of transmitters and a receiver of the plurality of receivers functioning as a master of the master/slave communication ring, with remaining transmitters and receivers functioning as slaves of the master/slave communication ring.

8. A data processing system, comprising:

a transmitter for receiving an input signal, and in response, providing a current having at least two values at an output node; and a receiver, comprising:

a low impedance input node coupled to the output node of the transmitter, for receiving the current;

a first transistor having a first current electrode, a control electrode, and a second current electrode coupled to the low impedance input node;

a second transistor having a first current electrode coupled to the low impedance input node, a control electrode, and a second current electrode;

a first current mirror having an input terminal coupled to the first current electrode of the first transistor, and an output terminal; and a second current mirror having an input terminal coupled to the second current electrode of the second transistor, and an output terminal coupled to the output terminal of the first current mirror for providing an output signal converted from the current having the at least two values to a voltage.

9. The data processing system of claim 8, wherein the transmitter comprises:

a first pair of series-connected transistors, a first transistor of the first pair of series-connected transistors for receiving an input signal, and a second transistor of the first pair of series-connected transistors for receiving a first bias voltage; and a second pair of series-connected transistors coupled to the first pair of series-connected transistors at the output node, a first transistor of the second pair of series-connected transistors for receiving the input signal, and a second transistor of the second pair of series-connected transistors for receiving a second bias voltage.

10. The data processing system of claim 8, wherein the receiver further comprises:

a differential amplifier having a first input terminal for receiving a reference voltage, a second input terminal coupled to the low impedance input node, and an output terminal coupled to the control electrode of the second transistor;

a third transistor having a first current electrode coupled to a first power supply voltage terminal, a control electrode for receiving a bias voltage, and a second current electrode coupled to the control electrode of the first transistor;

a fourth transistor having a first current electrode and a control electrode both coupled to the second current electrode of the third transistor, and a second current electrode; and a fifth transistor having a first current electrode coupled to the second current electrode of the fourth transistor, a control electrode coupled to the output terminal of the differential amplifier, and second current electrode coupled to a second power supply voltage terminal.

11. The data processing system of claim 8, wherein the receiver further comprises an inverter having an input terminal coupled to the low impedance input node, a first output terminal coupled to the control electrode of the first transistor, and a second output terminal coupled to the control electrode of the second transistor.

12. The data processing system of claim 8, wherein the first current mirror has a second output terminal, and the second current mirror has a second output terminal coupled to the second output terminal of the first current mirror for providing a second output signal.

13. The data processing system of claim 8, wherein the first current mirror comprises:

a first P-channel transistor having a source coupled to a first power supply voltage terminal, and a gate and a drain both coupled to the first current electrode of the first transistor; and a second P-channel transistor having a source coupled to the first power supply voltage terminal, a gate coupled to the gate of the first P-channel transistor, and a drain coupled to the output terminal of the second current mirror.

14. The data processing system of claim 8, further comprising a plurality of transmitters and a plurality of receivers, the plurality of transmitters and the plurality of receivers coupled together to form a master/slave communication ring for the data processing system, a transmitter of the plurality of transmitters and a receiver of the plurality of receivers functioning as a master of the master/slave communication ring, and with remaining transmitters and receivers functioning as slaves of the master/slave communication ring.

15. A data processing system, comprising:

a current mode transmitter for providing a current having at least two values at an output node, located on a first integrated circuit, the current mode transmitter comprising:

a first pair of series-connected transistors, a first transistor of the first pair of series-connected transistors for receiving an input signal, and a second transistor of the first pair of series-connected transistors for receiving a first bias voltage; and a second pair of series-connected transistors coupled to the first pair of series-connected transistors at the output node, a first transistor of the second pair of series-connected transistors for receiving the input signal, and a second transistor of the second pair of series-connected transistors for receiving a second bias voltage; and a current mode receiver, located on a second integrated circuit, the current mode receiver comprising:

a low impedance input node coupled to the output node of the current mode transmitter, for receiving the current;

a first transistor having a first current electrode, a control electrode, and a second current electrode coupled to the low impedance input node;

a second transistor having a first current electrode coupled to the low impedance input node, a control electrode, and a second current electrode;

a first current mirror having an input terminal coupled to the first current electrode of the first transistor, and an output terminal; and a second current mirror having an input terminal coupled to the second current electrode of the second transistor, and an output terminal coupled to the output terminal of the first current mirror for providing an output signal converted from the current having the at least two values to a voltage.

16. The data processing system of claim 15, further comprising a plurality of transmitters and a plurality of receivers, the plurality of transmitters and the plurality of receivers coupled together to form a master/slave communication ring for the data processing system, a transmitter of the plurality of transmitters and a receiver of the plurality of receivers functioning as a master of the master/slave communication ring, and with remaining transmitters and receivers functioning as slaves of the master/slave communication ring.

17. The data processing system of claim 15, further comprising a second receiver having an input node coupled to the output terminals of the first and second current mirrors, and an output terminal for providing a second output signal.

18. The data processing system of claim 15, wherein the current is further characterized as being a bi-directional current.

* * * * *